June 5, 1962 P. L. MOTHERSOLE 3,038,026
AUTOMATIC GAIN CONTROL CIRCUIT ARRANGEMENT
FOR TELEVISION RECEIVERS
Filed July 15, 1957 2 Sheets-Sheet 1

INVENTOR
PETER LEONARD MOTHERSOLE
BY
Frank R. Jifani
AGENT

June 5, 1962 P. L. MOTHERSOLE 3,038,026

AUTOMATIC GAIN CONTROL CIRCUIT ARRANGEMENT FOR TELEVISION RECEIVERS

Filed July 15, 1957 2 Sheets-Sheet 2

INVENTOR
PETER LEONARD MOTHERSOLE
BY
Frank R. Jifani
AGENT

United States Patent Office 3,038,026

Patented June 5, 1962

3,038,026
AUTOMATIC GAIN CONTROL CIRCUIT ARRANGEMENT FOR TELEVISION RECEIVERS

Peter Leonard Mothersole, Horley, England, assignor to North American Philips Company, Inc., New York, N.Y.

Filed July 15, 1957, Ser. No. 671,841
Claims priority, application Great Britain July 20, 1956
5 Claims. (Cl. 178—7.3)

Figure 1:
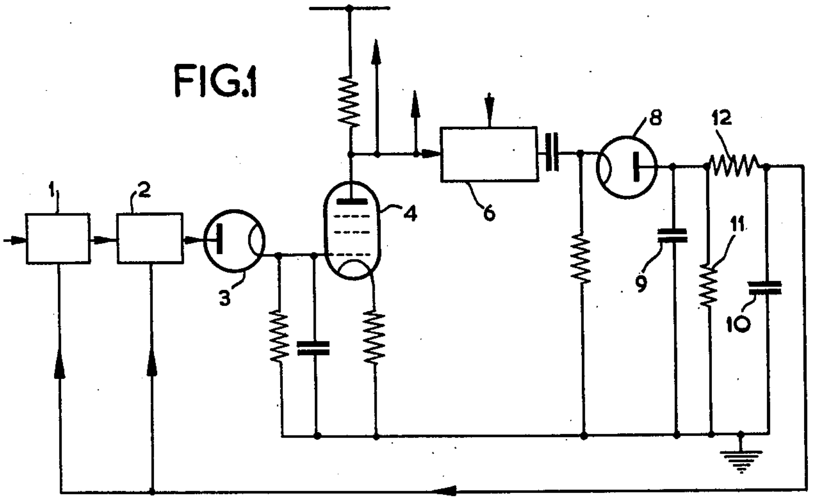

This invention relates to automatic gain control circuit arrangements for television receivers and more particularly to keyed automatic gain control circuit arrangements.

In television receivers comprising such automatic gain control circuit arrangements, as the received signal increases in amplitude the automatic gain control voltage increases and controls the gain of the RF and/or video IF amplifier whereby the video output signal which is supplied to the cathode ray tube is maintained at a constant amplitude.

In television receivers including a keyed automatic gain control circuit arrangement the output of the video signal amplifier is supplied, to the display cathode-ray tube and also to a synchronising separator which in turn controls the time bases, more particularly the line time base from which during flyback periods a keying pulse may be derived which can be employed for opening a gate circuit to which is also supplied the video signals. Alternatively the gate circuit may be operated by the output pulses from the synchronising separator. During normal operation the gate circuit is opened during the period when the "back porch" of the video signal is applied to the gate circuit. The output of the gate circuit is therefore a series of pulses whose amplitude is proportional to the black level of the video signal and on rectifying these pulses there is obtained a D.C. output proportional to the signal amplitude and this D.C. output is applied to control the gain of the RF and/or video IF signal amplifiers.

As the signal increases in amplitude, the automatic gain control voltage will increase and tend to maintain the video output signal constant amplitude. If the increase in signal amplitude is relatively slow the automatic gain control circuit can maintain control even on very strong signals. If the signal is disconnected and reapplied, e.g. by switching to an alternative channel, and the automatic gain control voltage is not able to develop at a sufficiently fast rate teh final IF amplifier and video amplifier may be overloaded. Under these conditions a distorted signal may develop at the video ampliefier anode which may be unable to operate the gate circuit. If this occurs the result is that no automatic gain control voltage is developed and the receiver remains in an overloaded condition.

The principal object of the invention is to provide a keyed automatic gain control circuit arrangement which mitigates or obviates this disadvantage.

According to the invention, a keyed automatic gain control circuit arrangement for a television receiver comprises an automatic gain control circuit for deriving an automatic gain control voltage for controlling the gain of an RF and/or video IF amplifier of the receiver, means for materially reducing or reducing to zero the gain of the amplifier and means for subsequently allowing the gain of said amplifer to recover, the gain recovery time being comparable to or greater than the time constant of the said automatic gain control circuit.

The gain recovery time of said amplifier may be determined by any suitable time-constant circuit and in a preferred circuit arrangement according to the invention the automatic gain control circuit itself acts as the means for allowing the gain of the amplifier to recover when the time of recovery of the gain of said amplifier is equal to the time constant of the automatic gain control circuit. Said means for materially reducing or reducing to zero the gain of said amplifier may comprise a circuit for deriving on the occurrence of a sudden overload condition of said amplifier a voltage which is applied to said amplifier for effecting such reduction. The last mentioned circuit may be a resistance-capacitance circuit connected in parallel with the video signal amplifier of the receiver and having a time constant greater than the period of one frame. Alternatively a noise limiting rectifier may be interposed between the video signal amplifier of the receiver and the resistance-capacitance circuit in which case the resistance-capacitance circuit may have a time constant less than the period of one frame.

When the invention is applied to a television receiver adapted to receive two or more channels and having a switch for switching from one channel to another, said means for materially reducing or reducing to zero the gain of the amplifier may alternatively comprise switching means whereby on switching from one channel switch position to any other channel switch position such reduction is effected.

Figures 2, 3:
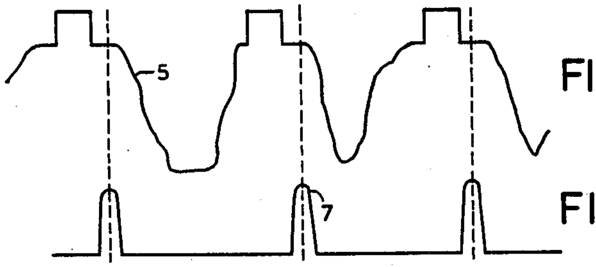
Figure 4:
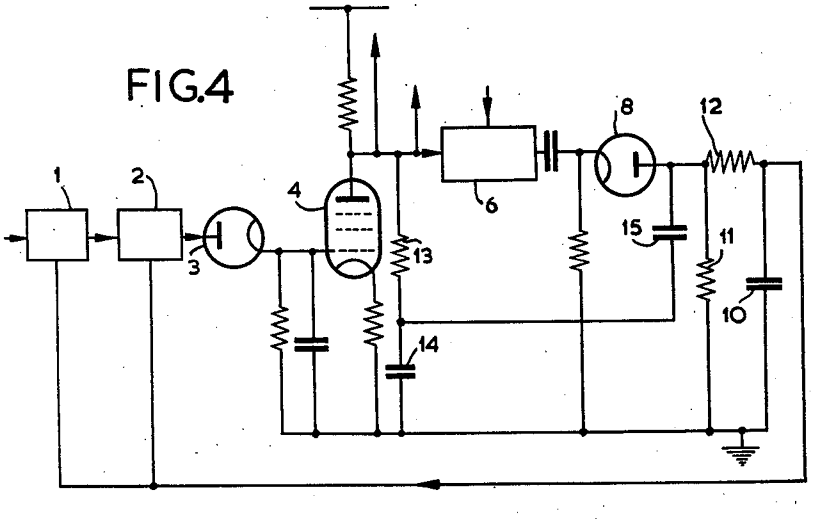
Figure 5:
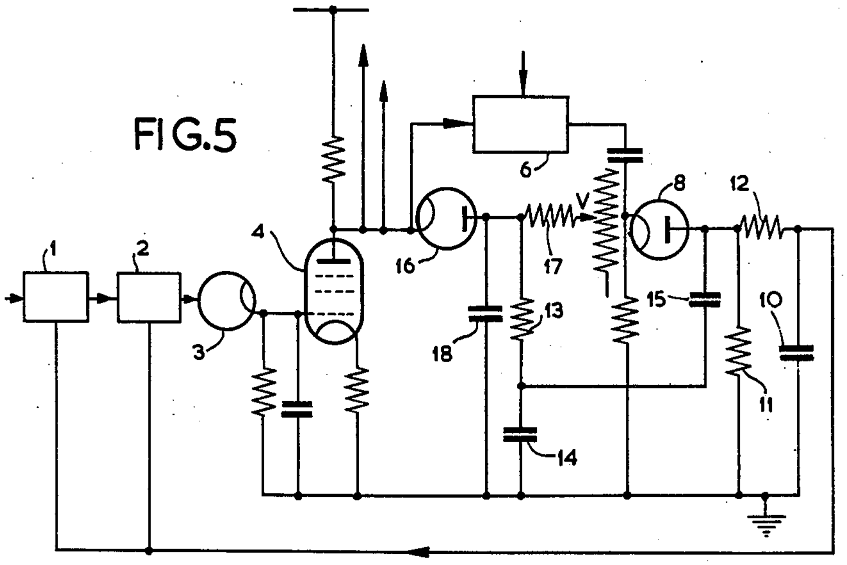
Figure 6:
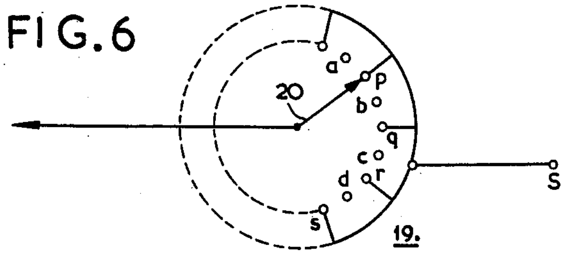

In order that the invention may be readily carried into effect embodiments thereof will now be described by way of example with reference to the accompanying drawing in which FIGURE 1 illustrates diagrammatically part of a typical picture signal channel of a television receiver including a keyed automatic gain control circuit arrangement, FIGURE 2 shows a video signal, FIGURE 3 shows a keying pulse train, FIGURE 4 shows the circuit arrangement of FIGURE 1 but with one embodiment of an automatic gain control circuit arrangement in accordance with the invention, FIGURE 5 shows the circuit arrangement of FIGURE 1 but with a further embodiment of an automatic gain control circuit arrangement in accordance with the invention, and FIGURE 6 shows schematically an even further embodiment of the invention.

The part of a typical picture signal channel of a television receiver shown in FIGURE 1 comprises an RF amplifier 1, video IF amplifier 2, video detector 3, and video amplifier 4.

A typical video signal 5, FIGURE 2, is applied to the cathode ray tube cathode, synchronising separator and automatic gain control gate 6. The gate is opened by a keying signal 7 of the form shown in FIGURE 3. The gate may consist of a diode, triode or pentode valve suitably connected so that the output pulse amplitude is proportional to the "back porch," or black level of the video signal 5, and is rectified by the diode 8 and smoothed by the circuit comprising capacitors 9, 10 and resistors 11, 12. The resulting negative D.C. output is therefore proportional to the signal amplitude and is applied to the RF and IF circuits as an automatic gain control voltage.

As the signal increases in amplitude, the automatic gain control voltage will increase, and tend to maintain the video output signal 5 constant amplitude. If the increase in signal amplitude is relatively slow the automatic gain control can maintain control even on very strong signals. If the signal is disconnected and reapplied, e.g. by switching to an alternative channel, and the automatic gain control voltage is not able to develop at a sufficiently fast rate the final IF amplifier and video amplifier will be overloaded. Under these conditions, a distorted signal will be developed at the video amplifier anode which is unable to operate the gate circuit 6. The result is that no automatic gain control voltage is developed and the receiver remains in an overloaded condition.

This overload, due to the sudden application of a high input signal may be prevented if, for example, the automatic gain control line is driven negative when the signal is applied. This may be done by a circuit arrangement to automatically drive the automatic gain control line negative when a signal is first applied such as that shown in FIGURE 4.

The signal at the video amplifier anode is connected through resistor 13 to the capacitor 14. The automatic gain control recifier smoothing capacitor 9 of FIGURE 1 is replaced by the series connected capacitors 15 and 14. The time constant of resistor 13 and capacitor 14 is made long, greater than one frame time, so that picture information is not able to cause changes in the automatic gain control voltage.

When a signal is suddenly applied to the receiver, the high positive output of the video detector 3 causes the anode of the video amplifier 4 to swing negative. This large negative swing is applied to the automatic gain control line by resistor 13 and capacitor 15 to bias back the RF and vision IF amplifiers and reduce the video detector output. As the negative surge falls to zero and the gain of the amplifiers recovers the signal will gradually increase in amplitude and the normal automatic gain control circuit take control. Suitable values for the circuit components 13, 14 and 15 are given as follows by way of example:

Resistor 13—330K.
Capacitor 14—0.1 $\mu$f.
Capacitor 15—0.1 $\mu$f.

In the arrangement shown in FIGURE 5 an automatic gain control circuit arrangement in accordance with the invention is shown applied to a television receiver which incorporates a noise limiting diode 16. The cathode of the diode 16 is connected to the anode of the video amplifier 4 and the diode anode is connected via resistor 17 to a source of variable potential V. The diode anode is also connected to earth via capacitor 18. As is known the purpose of such a diode arrangement is to prevent noise signals appearing on the display cathode ray tube and this is achieved by biassing the diode to substantially peak white potential so that noise signals which exceed this voltage level cause the diode 16 to conduct and do not appear therefore on the display tube.

With such an arrangement paralysis of the receiver due to overloading may be prevented in accordance with the invention by connecting the series resistor 13 and capacitor 14 in parallel with capacitor 18 and connecting the junction of resistor 13 and capacitor 14 to the anode of the diode 8 via capacitor 15.

On the occurrence of a sudden overload condition the video amplifier 4 conducts heavily, the diode 16 conducts and a negative surge is fed via resistor 13 and capacitor 15 to the automatic gain control line. This voltage surge charges negatively the automatic gain control circuit capacitors with the result that the gain of the RF and vision IF amplifiers is considerably reduced. As the charge leaks away the gain of the amplifiers recovers and the automatic gain control circuit is able to take over. Under normal conditions interference or noise pulses are filtered out by capacitor 18 and any voltage changes at the anode of diode 16 due to these pulses are further reduced by resistor 13 and capacitor 14 to ensure that no noise or interference voltages affect the automatic gain control line voltage. With the arrangement of FIGURE 5 the time constant of resistor 13 and capacitor 14 may be shorter than one frame time, since no signal is fed to the automatic gain control line except under overload conditions.

Suitable values of the circuit components 13, 14, 15 are given as follows by way of examples:

Resistor 13—330K.
Capacitor 14—0.02 $\mu$f.
Capacitor 15—0.02 $\mu$f.

FIGURE 6 illustrates schematically a further form of the invention which may be employed with the circuit arrangement of FIGURE 1. In FIGURE 6 a channel selector switch 19 has channel switch positions *a, b, c* . . . etc. and auxiliary contacts *p, q, r* . . . etc. which are ganged together and connected to a source S of negative voltage. The wiper 20 of the switch is connected to the automatic gain control line. On switching from, say, channel switch position *a* to position *b* the wiper passes over auxiliary contact *p* when a voltage pulse is applied to the automatic gain control line. The gain of the RF and vision IF amplifiers is thereby materially reduced as before and then slowly recovers and the automatic gain control circuit takes control. The source S may be constituted by any suitable negative voltage point within the receiver and in a practical case the point chosen was the grid of the line output valve, being at a voltage of about −30 volts.

What is claimed is:

1. A television receiver circuit comprising a gain-controlled amplifier connected to amplify a television signal modulated on a carrier, a detector connected to demodulate the amplified signal, a keyed gating circuit connected to derive periodic samplings of the demodulated signal, rectifier means connected to the output of said gating circuit to produce an automatic gain control voltage, means connected to apply said control voltage to said amplifier to reduce the gain thereof accordingly as the amplitude of said signal becomes greater, and means for preventing an overload condition of said gain controlled amplifier comprising two capacitors connected in series across the output of said rectifier means and a resistor connected between the input of said gating circuit and the junction of said capacitors.

2. A circuit as claimed in claim 1, further including a noise-limiting diode interposed between said input of the gating circuit and said resistor.

3. A gain control circuit for amplifying signals having periodic synchronizing pulses comprising gain controlled amplifier means connected to amplify said signal, keyed automatic gain control means connected to vary the gain of said amplifier means as a function of the amplitude of the signal output of said amplifier means, said gain control means comprising gate means keyed by pulses derived from said synchronizing pulses, and means for preventing an overload condition of said gain controlled amplifier means comprising serially connected resistance and capacitance means connected to the output of said amplifier means, and capacitor means coupling the junction of said resistance and capacitance means to said amplifier means to reduce the gain thereof whenever the amplitude of said signal increases relatively rapidly, the time constant of said resistor and capacitance means being greater than the period of said pulses.

4. A television receiver circuit comprising gain controlled amplifier means connected to amplify a television signal modulated on a carrier, detector means connected to said amplifier means for demodulating said signal, output amplifier means connected to said detector means and having output terminals, automatic gain control means connected in said circuit to provide an automatic gain control voltage in response to the amplitude of said signal, said gain control means having an output circuit means applying said gain control voltage to said gain controlled amplifier means, and means for preventing an overload condition of said gain controlled amplifier means comprising resistance means and first capacitor means serially connected to said output terminals and having a time constant greater than the frame period of said signals, and second capacitor means connecting the junction of said resistance and first capacitor means to said output circuit.

5. A television receiver circuit comprising gain controlled amplifier means connected to amplify a television signal modulated on a carrier, detector means connected to said amplifier means for demodulating said signal, output amplifier means connected to said detector means and having output terminals, a keyed automatic gain control circuit connected to said output terminals to provide an automatic gain control voltage in response to the amplitude of said signal, said gain control circuit having an output circuit, means connecting said output circuit to said gain controlled amplifier means to control the gain thereof, and means for preventing an overload condition of said gain controlled amplifier means comprising resistance means and first capacitor means serially connected to said output terminals and having a time constant greater than the frame period of said television signals, and second capacitor means connecting the junction of said resistance means and first capacitor means to said output circuit.

References Cited in the file of this patent

UNITED STATES PATENTS

| | | |
|---|---|---|
| 2,520,012 | Montgomery | Aug. 22, 1950 |
| 2,756,327 | Keizer | July 24, 1956 |
| 2,885,473 | Kraft | May 5, 1959 |